US011003618B1

(12) United States Patent
Constantinides et al.

(10) Patent No.: US 11,003,618 B1
(45) Date of Patent: May 11, 2021

(54) OUT-OF-BAND INTERCONNECT CONTROL AND ISOLATION

(71) Applicant: Amazon Technologies, Inc., Seattle, WA (US)

(72) Inventors: Kypros Constantinides, Seattle, WA (US); Nafea Bshara, San Jose, CA (US); Matthew Shawn Wilson, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 15/635,038

(22) Filed: Jun. 27, 2017

(51) Int. Cl.
*G06F 13/40* (2006.01)
*G06F 13/42* (2006.01)
*G06T 1/20* (2006.01)
*G06F 9/455* (2018.01)

(52) U.S. Cl.
CPC ...... *G06F 13/4291* (2013.01); *G06F 9/45558* (2013.01); *G06F 13/4022* (2013.01); *G06T 1/20* (2013.01); *G06F 2009/45595* (2013.01); *G06F 2213/0024* (2013.01); *G06T 2210/52* (2013.01)

(58) Field of Classification Search
USPC ..................................................... 710/8, 313
See application file for complete search history.

(56) References Cited

U.S. PATENT DOCUMENTS

| 6,765,919 | B1 * | 7/2004 | Banks | H04L 29/12056 370/254 |
| 8,499,348 | B1 * | 7/2013 | Rubin | G06F 21/554 713/154 |
| 9,483,290 | B1 * | 11/2016 | Mantri | H04L 67/1097 |
| 2005/0268154 | A1 * | 12/2005 | Wipfel | G06F 11/1425 714/4.1 |
| 2010/0149970 | A1 * | 6/2010 | Miranda | H04W 28/02 370/229 |
| 2017/0161100 | A1 * | 6/2017 | Rashid | G06F 9/4843 |
| 2017/0236244 | A1 * | 8/2017 | Price | G06T 1/20 345/504 |
| 2018/0239539 | A1 * | 8/2018 | He | G06F 3/0617 |
| 2018/0276044 | A1 * | 9/2018 | Fong | G06F 9/5038 |

* cited by examiner

*Primary Examiner* — Ilwoo Park
(74) *Attorney, Agent, or Firm* — Kilpatrick Townsend & Stockton LLP

(57) ABSTRACT

Disclosed are techniques regarding aspects of selectively enabling or disabling interconnects between peripheral processors. The peripheral processors may be included within a compute service provider and may be accessible via virtual machines within guest domains implemented within the compute service provider. The interconnects can be enabled or disabled depending upon whether they traverse domains of the compute service provider.

20 Claims, 10 Drawing Sheets

OUT-OF-BAND INTERCONNECT CONTROL AND ISOLATION

BACKGROUND

Cloud computing techniques can include use of networked computing resources (e.g., hardware and software) of a cloud provider to be made available for use by clients. Clients can access the networked computing resources via a network, such as the internet, to configure the networked computing resources to provide a service or to access a service provided by another client. Cloud computing techniques can facilitate more efficient use of networked computing resources by, for example, enabling the resources to be allocated as needed between clients (e.g., for clients to scale services operating on cloud computing resources or to prototype new cloud enabled services) and/or by allocating hardware in a time sliced manner to several clients concurrently.

Clients of cloud services may have diverse computing requirements resulting from different use cases. A cloud service provider can include various computer systems having different types of components with varying levels of performance and/or functionality. Thus, a client can select a computer system that is potentially more efficient at executing a particular task. For example, the cloud service provider can provide systems with varying combinations of processing performance, memory performance, storage capacity or performance, and networking capacity or performance. However, some clients may desire to use hardware that is proprietary or highly specialized for executing their computing tasks. Enabling use of client defined hardware (e.g., hardware over which a client has a relatively detailed level of control) within a cloud infrastructure can raise security and/or stability integrity concerns.

BRIEF DESCRIPTION OF THE DRAWINGS

Various embodiments in accordance with the present disclosure will be described with reference to the drawings, in which.

DETAILED DESCRIPTION

Figure 1:
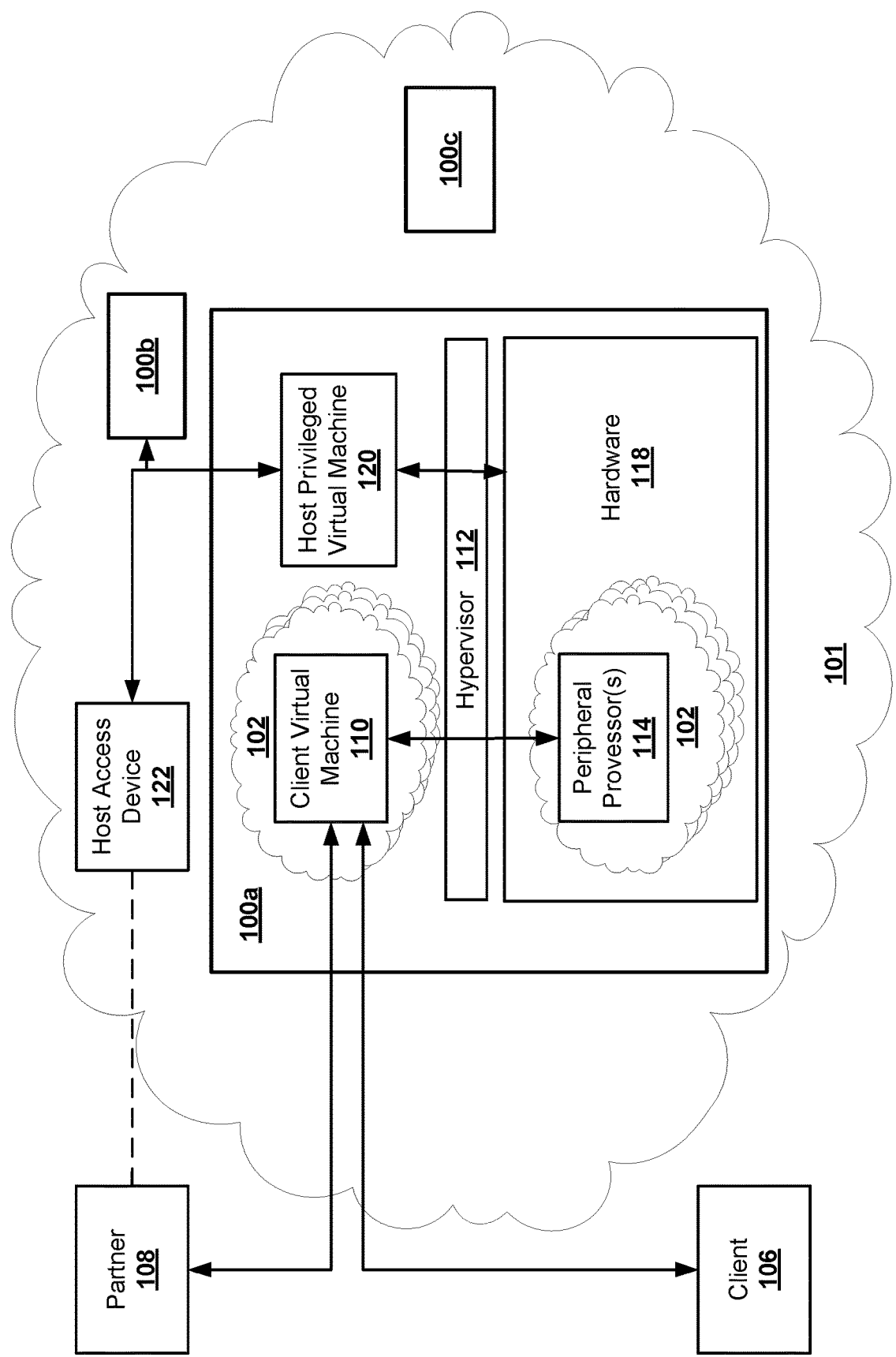
FIG. 1 illustrates a compute service providing system and corresponding domains according to certain embodiments.

Cloud service providers can utilize virtualization techniques which can include physically or logically isolating host services to a host domain and client services to one or more guest domains. A domain refers to, for example, a group of logical computer devices and/or hardware computers and devices on a network that are administered as a unit with common access privileges, rules and procedures. By isolating a guest domain from a host domain, a guest (e.g., a client) may be able to access certain functionality provided by a cloud service and may be restricted from accessing functionality of the host domain or other guest domains. Host domain functionality can include management of the cloud infrastructure which, if accessed by a client system, could jeopardize functionality of the cloud system. Other guest domains may be used to implement services offered by other clients. If separation between guest domains is jeopardized, then services of one guest domain may undesirably interfere with services of another.

Furthermore, logical domain separation can be used to abstract various platforms and services from the underlying hardware, providing flexibility within a cloud infrastructure to service a multitude of varied and differing client requirements and more efficiently assign the underlying hardware and other computer resources between client domains. A certain amount of overhead may be introduced to facilitate logical separation of different domains. This overhead may take the form of reduced performance of client services and/or client access to services. Certain clients may desire to have specialized computing resources (e.g., hardware computing resources, such as a peripheral processor that may include a parallel processor or Graphics Processing Unit (GPU)) that may enable more efficient processing of certain client functions. Disclosed are techniques that can be used to enable specialized computing resources within a cloud environment while still providing separation, within a cloud infrastructure, between domains of the cloud environment.

A solution for providing specialized computing resources in a cloud environment is to provide a networked computing resource including a hardware peripheral processor circuit (such as by providing a computer device with an add-in card including one or more peripheral processors, such as GPUs). The peripheral processors can be hardware devices that provide a guest domain with hardware access to peripheral processors to accelerate certain types of computing (e.g., High-performance computing (HPC), physics models, Fourier transforms, machine learning, data mining, fuzzy logic, tone mapping, digital signal processing, video processing, scientific computing, bioinformatics, cryptography, etc.) by, for example, removing bottlenecks or overhead associated with logical abstraction and/or by providing specialized fixed function hardware (such as parallel processors).

Certain peripheral processors can include specialized interconnects to other peripheral processors implemented via a hardware peripheral processor. The specialized interconnects can facilitate movement of data between the peripheral processors at relatively high bandwidth and/or low latency in order to support high speed computing. Examples of techniques that can be used to enhance computing using the specialized interconnects can include utilizing several peripheral processors to perform operations on a common data set. The common data set can be shared between the peripheral processors via the specialized interconnects. As another example, results of an operation performed by one peripheral processor can be transmitted to another peripheral processor. An example peripheral processor can be an Nvidia® GPU that can be coupled to another Nvidia® GPU via an NVLink® interconnect.

The peripheral processors may communicate with a host system via a shared or other data bus (e.g., a Peripheral Component Interface (PCI)) that may provide less bandwidth and/or more bandwidth for data exchange as compared to the specialized interconnects. In certain embodiments, the specialized interconnects can be dedicated and/or point-to-point interconnects between the peripheral interconnects. Thus, each peripheral processor may communicate with a host system via a first interface and via another peripheral processor via a second interface. In certain embodiments, the first interface may also be used to facilitate data transfer between peripheral processors, however, the data transfer may be of a different type and/or at a different speed as compared to the second interface.

The specialized interconnects can be facilitated via the use of specialized drivers and/or hardware in each of the peripheral processors. The specialized interconnects may be proprietary and may or may not be accessible by a host platform used to provide access to a corresponding peripheral processor. The specialized interconnects may be accessible to instructions implemented via a guest domain, such as on a peripheral processor. Therefore, the use of the peripheral processor can provide access to a corresponding specialized interconnect.

The techniques disclosed herein can be used to limit access between peripheral processors including, for example, disabling the specialized interconnects to prevent data from being shared and/or unauthorized access of data between peripheral components that are included within disparate corresponding domains. For example, a host system can determine that a first set of peripheral processors are included within a first guest domain and a second set of peripheral processors are included with a second guest domain. If so, specialized interconnects between peripheral processors of the first domain and the second domain can be disabled. For example, peripheral processors may be disposed within a peripheral device included within a computer system of a cloud infrastructure system. The cloud computing system may be able to assign the peripheral processors to client domains hosted by the cloud infrastructure system. A component of the cloud infrastructure residing within a higher privileged host domain may be able to use an out-of-band mechanism (e.g., a mechanism accessible by virtual and hardware devices within client domains) to enable or disable specialized interconnects between peripheral processor by modifying a clock signal provided to the peripheral processor that controls a corresponding specialized interconnect.

FIG. 1 illustrates a simplified logical diagram of a host domain 101 of a cloud infrastructure system that may provide one or more cloud enabled services to a client or a certain type of client referred to as a partner 108. Host domain 101 can reside within a cloud infrastructure system. Computer devices 100a-100c and host access device 122 can each reside within host domain 101 of the cloud infrastructure system. Logical and/or physical components of computer devices 100a-100c can be configured to be included in client domains on an as needed basis to support client requests. Hypervisor 112, client virtual machine 110, host privileged virtual machine 120, and hardware 118 can reside within computer device 100a. Hypervisor 112 can provide separation between domains of the cloud infrastructure system by, for example, managing interactions between logical and/or physical devices across between domains. A hypervisor may be used to generate and/or manage logical components that can be implemented using hardware components of a cloud infrastructure system.

Partner device 108 may be a device of a client of host domain 101 that is privileged to utilize cloud resources to provide a service. For example, partner device 108 can be used to request, via host access device 122, one or more resources of the cloud infrastructure system to enable a service. A client, via use of client device 106, may be a user of a service specified by a partner. Partner device 108 may have more privileged access to a cloud infrastructure system than client 106 in order to enable one or more services. Each service may be included within a corresponding client domain. The service can be enabled through use of one or more hardware components 118 of computer device 100a. Certain components of hardware components 118 may be assigned to a client domain as needed (such as to support a service specified by a partner). Components of hardware components 118 can be logically abstracted, via hypervisor 112, into a client virtual machine 110 that client device 106 or partner device 108 may be privileged to access. Hypervisor 112 can manage client virtual machine 110 and other virtual machines that may operate within host domain 101 (such as host privileged virtual machine 120). Host privileged virtual machine 120 is a type of virtual machine that may have privileged and/or direct access to hardware 118, drivers, or an operating system of computer device 100a. Hardware 118 can include processors, memory, fixed function hardware, peripherals, and/or peripheral processor(s) 114. The operating system may manage/schedule interactions between logical virtual machines and physical components within host domain 101. Client virtual machine 110 can be one of several virtual machines operating within computer device 100a and can be logically separated from hardware devices of host domain 101 that services client virtual machine 110.

In certain embodiments, a computer device, such as computer device 100b may be a purely hardware device that is included within a client domain (such as client domain 102). A client, via client device 106, may access computer device 100b via a corresponding client domain. Thus, hardware device(s) may be configured for access by a client of a service provider/cloud infrastructure without use of logical/virtualization techniques by isolating access to the hardware device(s) to the client (while included within the client domain). An access control entity can limit access between components within a service-provider infrastructure (such as a cloud infrastructure network) in a spatial and/or time partitioned manner to enable each of client or users of the service provider network access to components within their respective domain while limiting access by other users. However, access may still be allowed for a device or user having a higher privilege level (e.g., a device or user within host domain 101). A hypervisor is an example of an access control entity that can manage access between logical and/or physical devices between domains.

The logical separation of client virtual machine 110 can be accomplished by logically isolating client virtual machine 110 into a client domain 102. Client domain 102 can be separated from a host domain 101 of a cloud infrastructure system. Hypervisor 112 may reside on the host domain 101 but have access to client domain 102, whereas virtual or physical devices of client domain 102 may be prevented from accessing virtual or physical devices of host domain 101 (or other client domains). Techniques disclosed herein can be used to create and manage peripheral processor(s) 114 within the cloud infrastructure system. Disclosed techniques can also be used to manage interactions between virtual (e.g., logically abstracted) components of a client domain and hardware components residing within the same domain. The techniques can include preventing unauthorized accesses between client domains. Access between client domains can result in system instability, data theft, or other undesirable affects to a cloud infrastructure system.

Peripheral processor(s) 114 can be configured to act as a hardware accelerator, for example. The hardware accelerator can be created using peripheral processors such that multiple clients may be able to configure differing accelerators using a same underlying hardware device. As disclosed herein, peripheral processor(s) 114 may reside within client domain 102. However, access between client virtual machine 110 and peripheral processor(s) 114 may pass through a host domain 101 of a cloud infrastructure system so that the cloud infrastructure system can manage and monitor access to the underlying hardware components implementing peripheral processor(s) 114.

Peripheral processor(s) 114 can be included within one or more peripheral circuits that can be included within hardware 118. Peripheral processors within a same peripheral circuit can be interconnected using specialized and/or dedicated interfaces as disclosed herein. Each of peripheral processor(s) 114 can be included within a respective client domain in any combination. Using techniques disclosed herein, specialized interfaces that traverse domains can be severed to prevent unintended access between domains.

Figure 2:
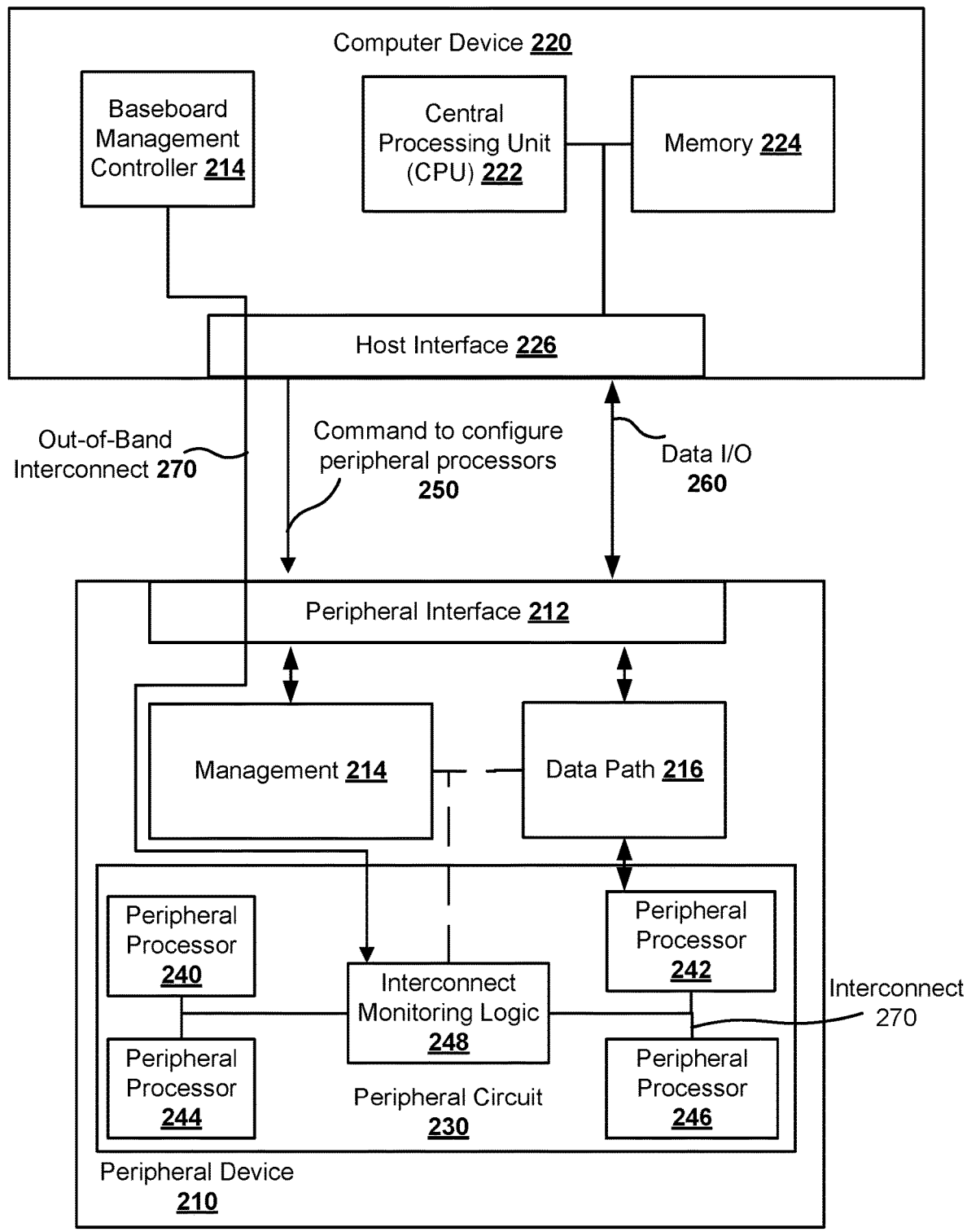
FIG. 2 illustrates a system diagram showing an example of a system including a peripheral circuit.

FIG. 2 is a system diagram showing an example of a computing system 200 including a peripheral device 210 and a computer device 220. System 200 can be used to implement client virtual machine 110 and/or peripheral processor(s) 114 of FIG. 1. For example, peripheral circuit 230 can include peripheral processors 240-246 that can be similar to peripheral processor(s) 114 and client virtual machine 110 can be implemented within computer device 220. Computer device 220 can include a central processing unit (CPU) 222, memory 224, a baseboard management controller (BMC) 214, and a host interface 226. BMC 214 can provide privileged access to host domain functionality of a computer system including computer device 201 and peripheral device 210. BMC 214 can be accessible via a host privileged virtual machine (e.g., host privileged virtual machine 120), a hypervisor, or other privileged devices. BMC 214 may have low level access to functionality of hardware components of computer device 220 and/or 210 that may be inaccessible via a client domain. A BMC may also be accessible through a network link by a remote management service. The CPU 222 can be used to execute instructions stored in the memory 224. For example, the memory 224 can be loaded with all or a portion of the cloud service and the CPU 222 can execute the instructions of the cloud service. The cloud service can communicate with a hardware accelerator of the peripheral device 210 by issuing commands using the host interface 226.

A command can be a read request, a write request, a read response, a message, an interrupt, or other data transmittals. The command can occur on a bus shared by multiple components. Specifically, values of signal lines of the bus can be modulated to transfer data on the bus using a communications protocol of the bus. The command can occur over one or more phases, such as an address phase and one or more data phases. Additionally or alternatively, the command can occur using one or more serial lines of a point-to-point interconnect that connects two components. Specifically, the command can be sent in a packet that is transmitted over the point-to-point interconnect.

The host interface 226 can include a bridge for communicating between the CPU 222 using a local or front-side interconnect and components using a peripheral or expansion interconnect. Specifically, the host interface 226 can be connected to a physical interconnect that is used to connect the computer device 220 to the peripheral device 210 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the computer device 220 to the peripheral device 210. Thus, the computer device 220 and the peripheral device 210 can communicate using PCI bus commands or PCIe packets, for example.

The peripheral device 210 can include a peripheral interface 212, a management module 214, and data path module 216. The peripheral circuit 230 can include peripheral processors 240-246 that can, in any combination, be configured to implement a hardware accelerator, for example.

Peripheral interface 212 can be used for communications between peripheral device 210 and computer device 220. Specifically, the peripheral interface 212 can be used to enable communication with the computer device 220 using a communication protocol and a physical interconnect. As one example, the computer device 220 can communicate with the peripheral device 210 using a command including an address associated with the peripheral device 210. Similarly, the peripheral device 210 can communicate with the computer device 220 using a command including an address associated with the computer device 220. The addresses associated with the various devices connected to host interface 226 can be predefined by a system architect and programmed into the devices. Additionally or alternatively, the communication protocol can include an enumeration sequence where the devices connected to the host interface 226 are queried and where addresses are assigned to each of devices as part of the enumeration sequence. As one example, the host interface 226 can issue queries to each of the devices connected to the host interface 226. The peripheral interface 212 can respond to the queries by providing information about the peripheral device 210, such as how many functions are present on the peripheral device 210, and a size of an address range associated with each of the functions of the peripheral device 210. Based on this information, addresses of the computing system 200 can be allocated such that each function of each device connected to the physical interconnect is assigned a non-overlapping range of addresses. After enumeration, the peripheral interface 212 can route commands to functions of the peripheral device 210 based on an address of the command.

Management module 214 can be used for managing and configuring the peripheral device 210. Commands and data can be sent from the computer device 220 to the management module 214 using commands that target the address range of the management module 214. For example, the computer device 220 can generate commands to transfer data (e.g., configuration data) and/or write control registers of the peripheral device 210 that are mapped to one or more addresses within the address range of the management module 214. Writing the control registers can cause the peripheral device 210 to perform operations, such as configuring and managing the peripheral device 210. As a specific example, configuration data corresponding to configuration of peripheral processors 240-246 can be transmitted from the computer device 220 to the peripheral device 210 in one or more commands between host interface 226 and peripheral interface 212. A command 250 to configure the peripheral processors 240-246 can be transmitted from the computer device 220 to the peripheral device 210. Specifically, the command 250 can write a value to a control register mapped to the management module 214 address space that will begin configuring the peripheral processors 240-246. In one embodiment, the configuration data can be transferred from the computer device 220 to the peripheral device 210 before the configuration of the peripheral processors 240-246 begins. For example, the management module 214 can cause the configuration data to be stored in an on-chip or off-chip memory accessible by the peripheral device 210, and the configuration data can be read from the memory when the peripheral processors 240-246 are being configured. In another embodiment, the configuration data can be transferred from the computer device 220 to the peripheral device 210 after the configuration of the peripheral processors 240-246 begins. For example, a control register can be written to begin configuration of the peripheral processors 240-246 and the configuration data can be streamed into or loaded onto the peripheral processors 240-246 as commands including the configuration data are processed by the management module 214.

Data path module 216 that can be used to exchange information (e.g., data input/output 260) between the computer device 220 and the peripheral device 210. Specifically, commands and data can be sent from the computer device 220 to the data path module 216 using commands that target the address range of the data path module 216. Similarly, the peripheral device 210 can communicate with the computer device 220 using a command including an address associated with the computer device 220. The data path module 216 can act as a translation layer between the peripheral interface 212 and the client configurable logic 240. Specifically, the data path module 216 can include an interface for receiving information from the client configurable logic 240 and the data path module 216 can format the information for transmission from the peripheral interface 212. Formatting the information can include generating control information for one or more commands and partitioning data into blocks that are sized to meet protocol specifications. Thus, the data path module 216 can be interposed between the peripheral processors 240-246 and the physical interconnect. In this manner, the peripheral processors 240-246 can potentially be blocked from formatting commands and directly controlling the signals used to drive the physical interconnect so that the client configurable logic 240 cannot be used to inadvertently or maliciously violate protocols of the physical interconnect.

Figure 3:
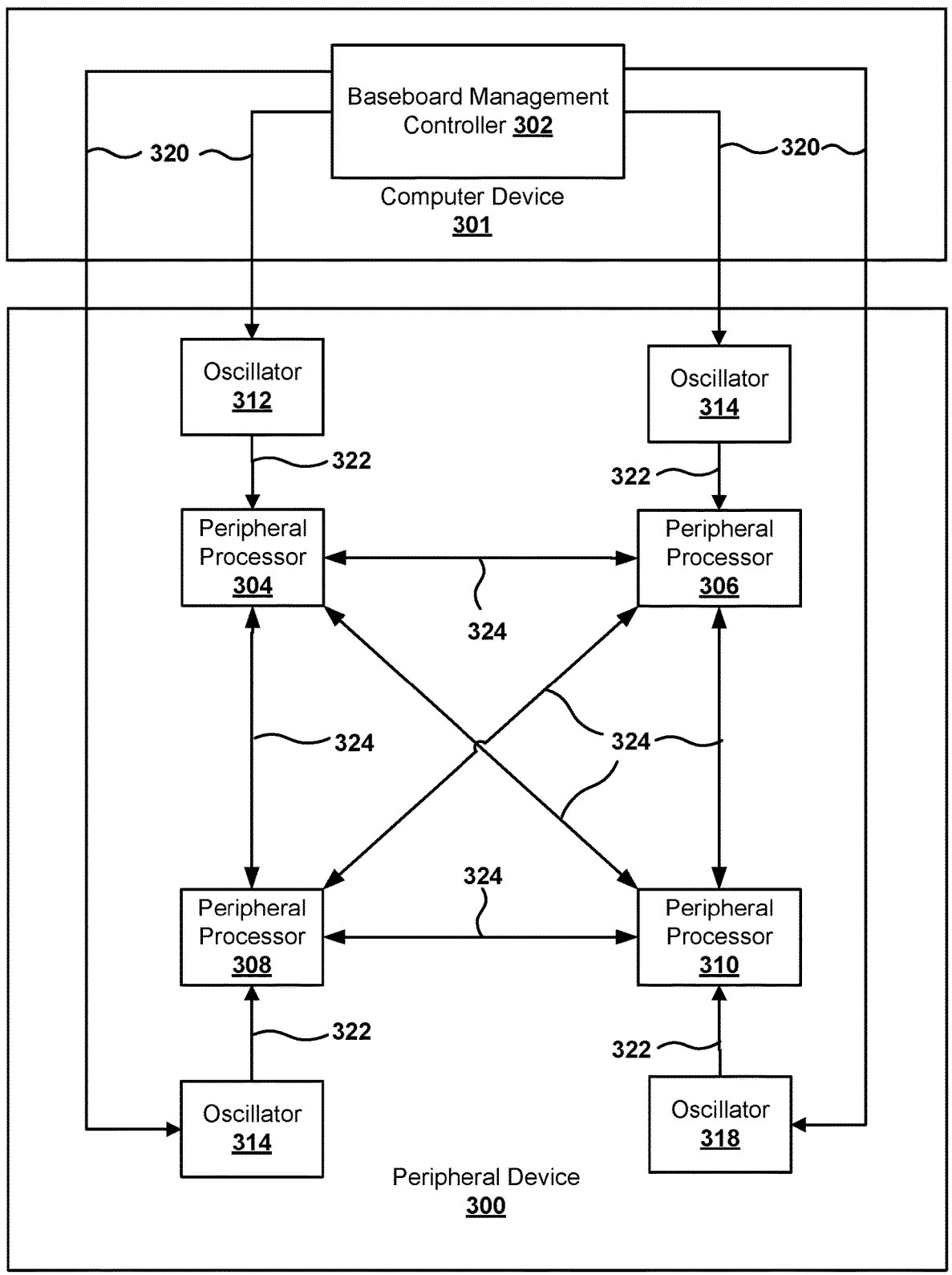
FIG. 3 illustrates a system including additional features of a peripheral device.
Figure 5:
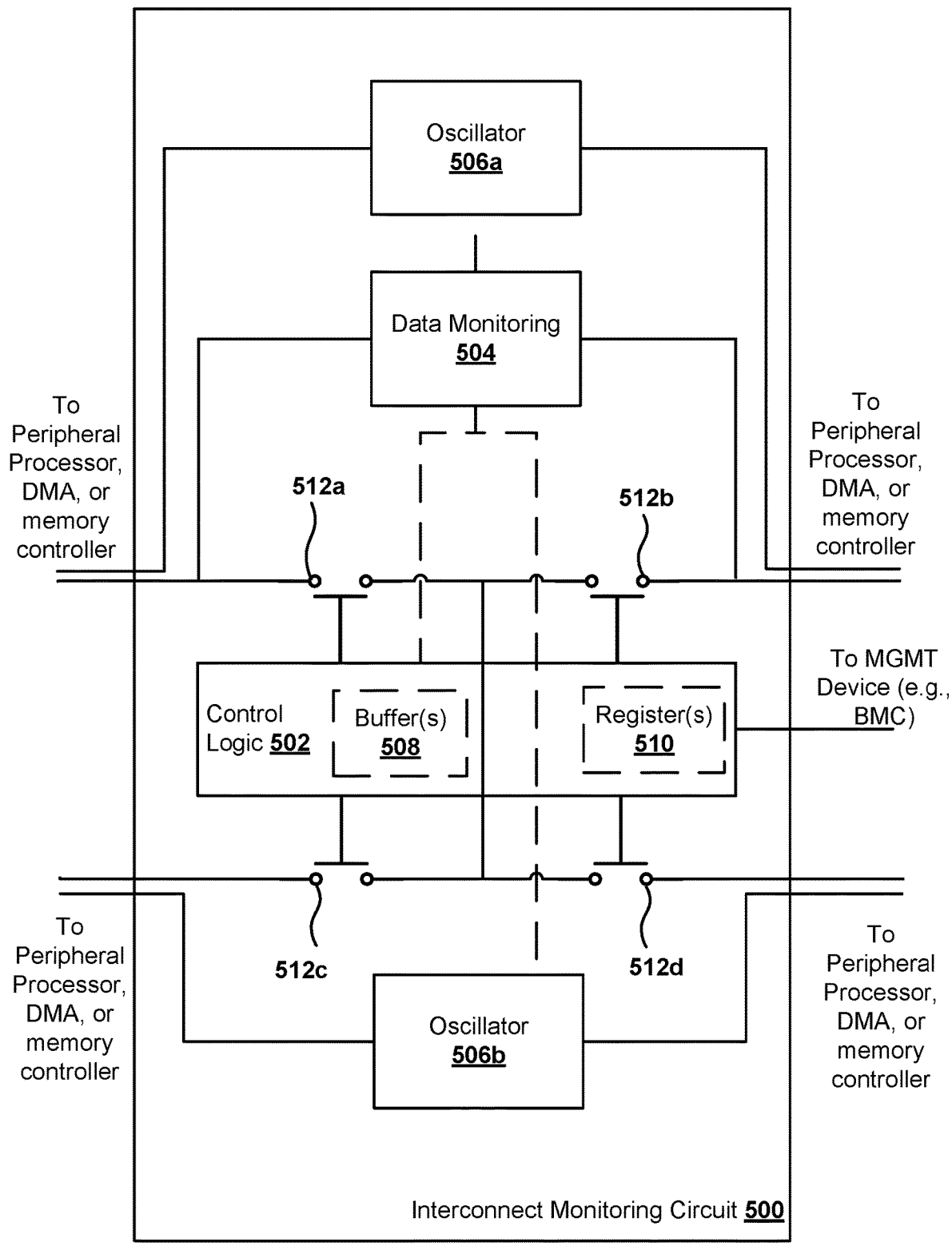
FIG. 5 illustrates a system diagram of an interconnect monitoring circuit of FIG. 4.

Peripheral circuit 230 can include interconnect(s) 270 that can be used as specialized interconnects between peripheral processors 240-246. As disclosed herein, interconnects 270 can be used to provide relatively high bandwidth and/or low latency data paths between peripheral processors 240-246 to accelerate processing tasks assigned to the peripheral processors 240-246. Interconnect(s) 270 can each be a point-to-point interconnect between peripheral processors 240-246. In certain embodiments, interconnect monitoring logic 248 can be used to monitor and/or enable or disable any of interconnect(s) 270. For example, management module 214 can be coupled to interconnect monitoring logic 248. Peripheral processors 240-246 can be configured by management module 214 to be included in one or more client domains, in any combination. For example, peripheral processor 240 may be included in a first client domain and peripheral processor 242 may be included in a second client domain. If so, management module 214 can send a command to interconnect monitoring logic 248 to disable or sever one of interconnect(s) 270 coupling peripheral processor 240 and peripheral processor 242 to prevent inadvertent communication between the first client domain and the second client domain utilizing the one of interconnect(s) 270. FIGS. 3 and 5 provide additional features of certain embodiments including interconnects between peripheral processors and management of the interconnects.

In certain embodiments, BMC 214 can utilize an out-of-band interconnect 280 to access or provide functionality of interconnect monitoring logic 248. Out-of-band interconnect 280 can be an interconnect outside the band (e.g., physically separated or separated via protocol) of a communication link used to transmit the data I/O 260. As one example, data I/O 260 may be transmitted via a PCI bus whereas out-of-band interconnect 280 can be a Serial Peripheral Interface (SPI), Inter-Integrated Circuit (I2C), or similar interconnect. As illustrated, out-of-band interconnect 280 can directly access interconnect monitoring logic 248 and may be used to control enabling or disabling of interconnects 270 depending on which client domain(s) peripheral processors 240-246 are assigned to.

FIG. 3 illustrates additional features regarding enabling or disabling high-speed interconnects between peripheral processors. Illustrated is computer device 301, which can be similar to computer device 220, and peripheral device 300, which can be similar to peripheral device 210. Computer device 301 includes BMC 302. As discussed regarding FIG. 2, BMC 302 can directly control functionality of peripheral device 300 to enable or disable interconnects 324 between peripheral processors 304-310 depending on which client domain each of peripheral processors 306-310 are included within.

As illustrated, BMC 302 can have direct access to clock generator(s), such as oscillators 312-318, via respective ones of links 320. Each of links 320 can be an out-of-band interconnects similar to out-of-band interconnect 280. For example, each of links 320 can be a SPI, I2C, or similar interface that may be a dedicated interface isolated from interfaces (not illustrated) between computer device 301 and peripheral device 300 utilized to transfer data between client virtual machine(s) and respective ones of peripheral processors 304-310.

As disclosed herein, each of interconnects 324 can be high-speed data interconnects, such as NVLink® interconnects, that can enable data transfer between peripheral processors 304-306. Interconnects 324 can be unidirectional (not illustrated) or bidirectional links (as illustrated). Each of peripheral processors 304-310 can be coupled to a respective one of oscillators 312-318. Each of oscillators 312-318 can provide a clock signal to the corresponding one of peripheral processors 304-310. Each of peripheral processors 304-310 can utilize a clock signal generated by one of oscillators 312-318 to derive a clock speed that respective ones of interconnects 324 operate according to. For example, the clock signal may directly drive interconnect 324 drivers or be read by drivers of interconnects 324 in order to derive a speed at which communications via interconnects 324 operate. Clock signals generated by oscillators 312-318 can be transmitted via interconnects 322.

Although four distinct oscillators 312-318 are illustrated, an oscillator may be utilized that may be configured to output multiple clock signals. Each of peripheral processors 304-310 may accept any number of clocks signal to derive interconnect 324 data transmission speeds. For example, peripheral processor 304 may receive two separate clock signals from oscillator 312 each corresponding to a respective unidirectional or bidirectional one of interconnects 324.

Utilizing links 320, BMC 302 can write to a respective register of each of oscillators 312-318, provide a respective analog signal to each of each of oscillators 312-318, or other transmit a command to the oscillators to alter a clock generated by each of oscillators 312-318. For example, BMC 302 may disable one of interconnects 324 by commanding a corresponding oscillator to cease outputting a clock signal. BMC 302 may otherwise disable one of interconnects 324 by commanding a corresponding oscillator to output a clock signal outside of an operational range utilizable by a corresponding one of peripheral processors 304-310 to derive an operating speed of the interconnect. BMC 302 may enable interconnects 324 in any order to operate at one of several speeds by modifying clock signal(s) output by oscillators 312-318.

Figure 4:
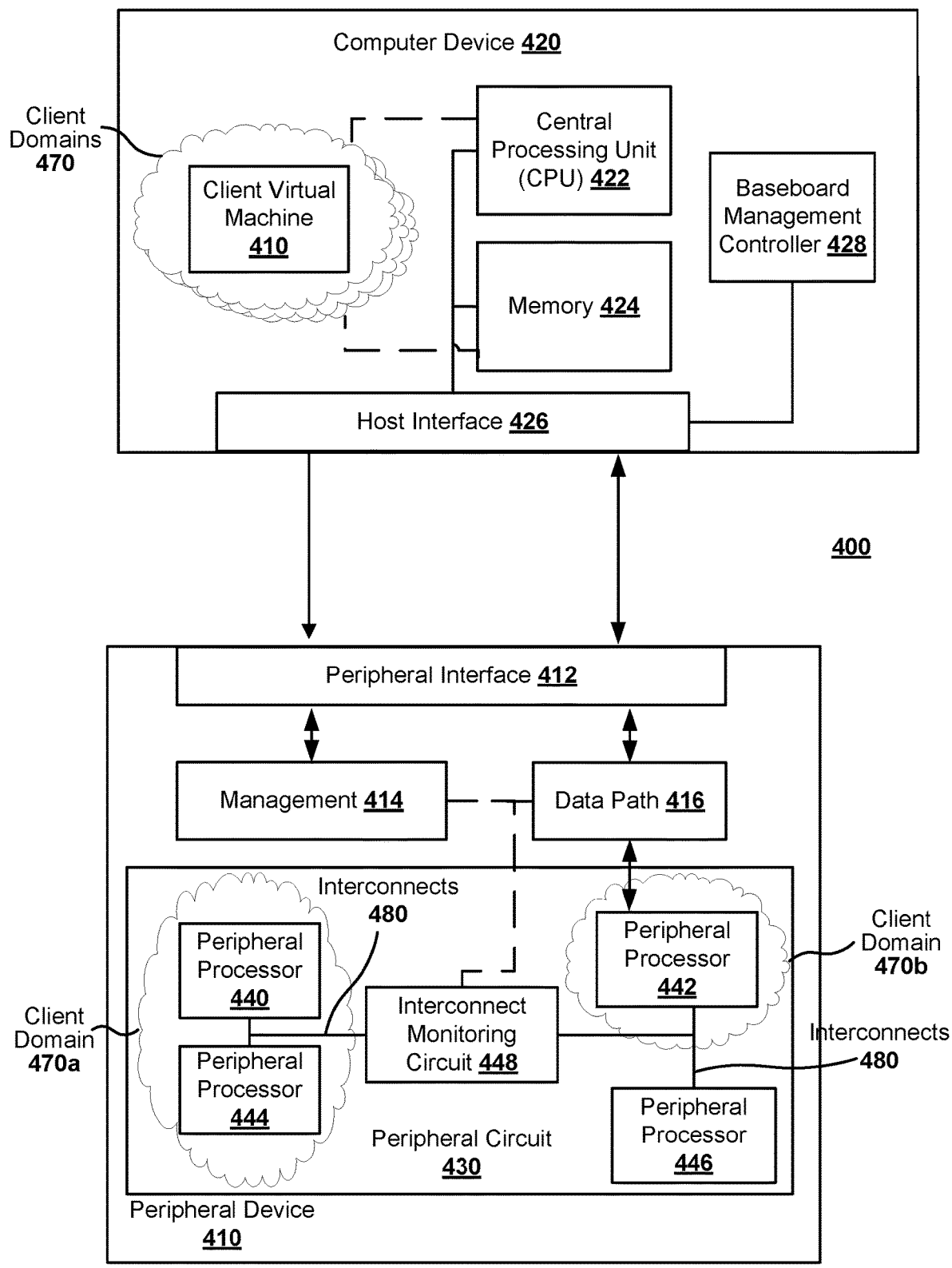
FIG. 4 illustrates a system diagram including additional features of a system including a peripheral circuit including domains similar to the domains of FIG. 1.

FIG. 4 is a system diagram showing an example of a computing system 400 including a peripheral device 410 and a computer device 420. System 400 can be similar to system 200.

System 400 includes a computer device 420 that can be similar to computer device 220 and includes a CPU 422, BMC 428, and memory 424. As illustrated, CPU 422 and memory 424 can be used to generate a plurality of client domains 470. Each of client domains 470 can include logical resources (not illustrated) used to execute a respective virtual machine, such as client virtual machine 410. The logical resources can be generated using CPU 422, memory 424, and other resources of computer device 420. Client virtual machine 410 can access functionality of peripheral device 410 via host interface 426. Each of client domains 470 can include a respective client virtual machine that can access functionality of peripheral device 410 via a same host interface 426.

System 400 includes a peripheral circuit 430 including peripheral processors 440-446. Peripheral processors 440-446 can be apportioned to client domains 470 in any combination. Peripheral processors 440 and 444 are illustrated as being included in client domain 470a, which can be one of client domains 470. Peripheral processor 442 is illustrated as being included in client domain 470b which can be one of client domains 470. If client virtual machine 410 is included within client domain 470a, then client virtual machine 410 can access peripheral processors 440 and 444. If client virtual machine 410 is included within client domain 470b, then client virtual machine 410 can access peripheral processor 442. Peripheral processor 446 is illustrated as being unassigned to a client domain. Although four peripheral processors 440-446 are illustrated, peripheral circuit 430 can include any number of peripheral processors.

Peripheral processors 440-446 can be hardware devices (e.g., GPUs, FPGAs) included within peripheral circuit 430. Client virtual machine 410 can be implemented using logical resources of computer device 420 but may have access to a respective group of peripheral processors 440-446 that are included within the same client domain as client virtual machine 410. Management block 414 can be accessible by a host virtual machine (not illustrated) that may reside on a host domain and be assigned a higher privilege level than client virtual machines. The higher privilege level can enable the host virtual machine to configure peripheral processors 440-446 or run diagnostics on underlying hardware (including peripheral processors 440-446), for example. Data Path module 416 can be used to transfer data between client virtual machine 410 and a group of peripheral processors 440-446. The data can include commands for the group of peripheral processors 440-446 to execute certain instructions and/or gather certain data. The data can also include results of the group of peripheral processors 440-446 performing the instructions on the certain data, for example.

As illustrated, peripheral processor 442 and peripheral processor 492 may be located within disparate computer or peripheral devices (e.g., peripheral device 410 and computer or peripheral device 490) and still be included within client domain 470b if so isolated by a hypervisor or other access control entity. For example, peripheral device 410 and computer or peripheral device 490 may each be PCI-based accessory cards. Computer or peripheral device 490 can be a computer device similar to computer device 420 and/or a combination of functionality of computer device 420 and peripheral device 410. Computer or peripheral device 490 may be coupled to computer device 420 and/or peripheral device 410 via any combination of serial, parallel, or bus-based interface(s).

Peripheral circuit 430 can also include interconnect monitoring circuit 448. Interconnect monitoring circuit 448 can perform a variety of functions. For example, interconnect monitoring circuit 448 can manage or configure interconnects 480 based upon commands received from management block 414, for example. Interconnects 480 can be similar to interconnects 270 and can enable high-speed data to be transferred between peripheral processors 440-446, depending on a configuration of interconnects 480. As disclosed herein, interconnects 480 can include point-to-point or bus interconnects in any combination. For example, interconnect monitoring circuit 448 can disable ones of interconnects 480 coupled peripheral processor 440 to peripheral processor 442 and peripheral processor 446 and enable ones of interconnects 480 coupling peripheral processor 440 to peripheral processor 444 upon determining that peripheral processors 440 and 444 reside within a same client domain (such as client domain 470a) separate from domain(s) of peripheral processor 442 and peripheral processor 446. Interconnect monitoring circuit 448 may also verify data or instructions received from data path module 416 prior to peripheral processors 440-446 acting upon the data or instructions. Further details of interconnect monitoring circuit 448 are illustrated in FIG. 5.

FIG. 5 illustrates interconnect monitoring circuit 500 that can be similar to interconnect monitoring circuit 448. Interconnect monitoring circuit 500 can include control logic 502 configured to change a state of switches 512a-512d depending upon a command received via an out-of-band interconnect from a BMC. The command may also be received from a host virtual machine (via a MGMT device, for example). As illustrated, interconnect monitoring circuit 500 can interface with a plurality of peripheral processors and, based upon configurations of switches 512a-d, enable or disable communications, in any combination, between coupled peripheral processors. Switches 512a-512d can be electrical switches, optical switches, multiplexer(s), etc. In certain embodiments, instead of or in addition to utilizing switches 512a-512d, oscillators 506a-506b can be utilized to enable or disable communication between peripheral processors. As illustrated in FIG. 3 oscillators, such as oscillators 560a-506b, can be arranged such that an oscillator is collocated in proximity to a respective peripheral processor that the oscillator provides a clock signal to. Although oscillator 506a is illustrated as being a separate component than oscillator 506b, they can be a same component or any number of components. In certain embodiments, a peripheral processor can be provided a clock signal indicating a speed at which the peripheral processor communicates with other peripheral processors via a specialized interconnect. For example, certain Nvidia® GPUs may be provided a clock signal indicating a speed at which an NVLink® operates. By modifying or disabling a clock signal provided to a peripheral processor, communication between the peripheral processors can be modified or disabled. Oscillators 506a and 506b may therefore be configured to provided variable clock signals (e.g., frequencies) and may provide the variable clock signals to respective peripheral processor(s).

Control logic 502 can, in certain embodiments, include registers 510. Register(s) 510 can be written to, via a command from a MGMT device, such as a BMC. Value(s) of register(s) 510 can be read by control logic 502 and the value(s) utilized to configure specialized communication interfaces between peripheral processors coupled to interconnect monitoring circuit 500. For example, a certain value of register(s) 510 can correspond to enabling or disabling a combination of switches 512a-512d.

In certain embodiments, control logic 502 can include functionality to route data transferred between peripheral processors. For example, control logic 502 can operate as a controller between peripheral processors. Command(s) transferred between peripheral processors can include an address of peripheral processor(s) that the command(s) are transmitted to. Control logic 502 can read the address and route the command to the appropriate peripheral device.

Control logic may 502 also include buffer(s) 508 in order to temporarily queue commands between peripheral processors. Control logic 502 can be configured to enable or disable communications between peripheral processors by, for example, allowing communications to reach a peripheral processor having an assigned address range corresponding to a domain shared by the transmitting peripheral processor. Thus, if a command is detected that is transmitted outside of a range of addresses determined to correspond to a device in a like domain, the command can be dropped, trapped, or otherwise prevented from reaching a device outside of the domain. Although communications between peripheral processors are described in detail, the specialized interconnects can be used to transfer data between peripheral processor(s), memory controller(s) or DMA engine(s), for example, in any combination.

Data Monitoring logic 504 can be used to determine an errant event, such as an error or inappropriate condition regarding data transfer between peripheral processor(s). For example, data may transferred using an unsupported frequency or protocol, to an unsupported address, to a device in a different domain, etc. Data monitoring logic 504 can be coupled to interfaces between peripheral processors and/or to control logic 502. Upon detection of an errant event, data monitoring logic 504 can send a command to control logic 502 to, for example, disable one or more interconnects between peripheral processor(s). Furthermore, control logic 502 may signal to a MGMT device that the errant device has been detected. For example, register(s) 510 may be read by the MGMT device to determine whether the errant event has been detected.

Figure 6:
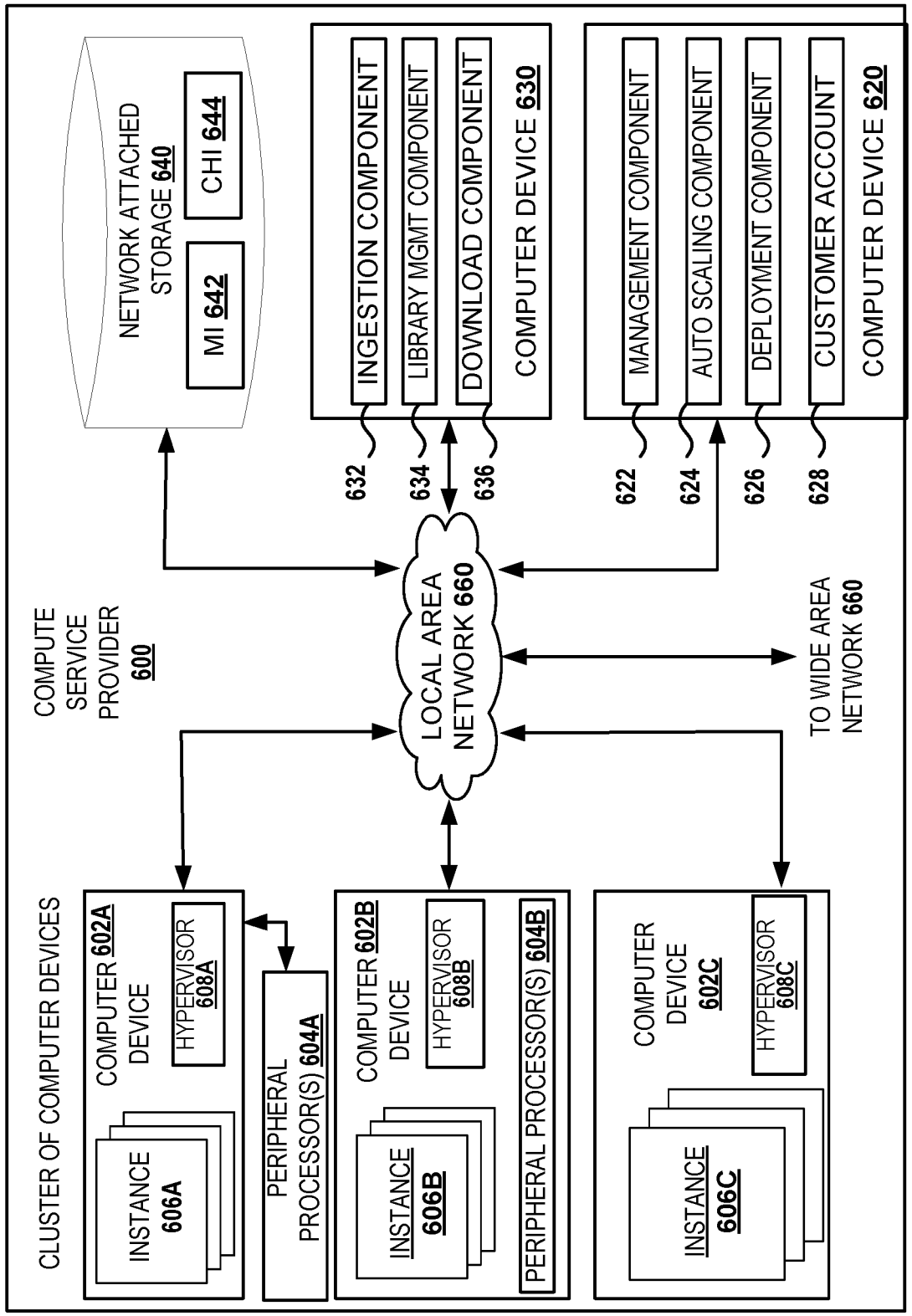
FIG. 6 illustrates an example compute service provider according to certain embodiments.

FIG. 6 illustrates a computing system diagram of a network-based compute service provider 600 that illustrates one environment in which embodiments described herein can be used. By way of background, the compute service provider 600 (i.e., the cloud provider) is capable of delivering computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of clients operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 600 using networked client devices, such as desktop computers, laptops, tablets, smartphones, etc., running web browsers or other lightweight client applications. Those skilled in the art will recognize that the compute service provider 600 can be described as a "cloud" environment. Tenants of a multi-tenant environment can include a partner or client as described with regards to FIG. 1. Each of the tenants can be assigned to a respective domain similar as described herein regarding guests, partners, and clients and respective domain(s).

The particular illustrated compute service provider 600 includes a plurality of computer devices 602A-602C. While only three computer devices are shown, any number can be used, and large centers can include thousands of computer devices. The computer devices 602A-602C can provide computing resources for executing instances 606A-606C. In one embodiment, the instances 606A-606C are virtual machines. As known in the art, a virtual machine can include logical resources that are emulated using physical components of machine(s) (e.g. computers). In the example of a virtual machine, each of the computer devices 602A-602C can be configured to execute a hypervisor 608A-608C or another type of program configured to enable the execution of multiple instances 606 on a single computer device. Additionally, each of the instances 606 can be configured to execute one or more applications. The applications can include user or non-privileged programs, kernel or privileged programs, and/or drivers. In another embodiment (not shown), the instances can include an operating system and application programs controlled by a single client. Thus, the computer service provider 600 can partition the resources of a given computer device among multiple clients (such as by providing a different virtual machine to each client) and/or provide the full resources of a computer device to a single client. Each of instances 606 can reside within a respective client domain for the respective client (along with client configurable logic hardware).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The computer devices 602A-602C can include a heterogeneous collection of different hardware resources or instance types. Some of the hardware instance types can include configurable hardware that is at least partially configurable by a user of the compute service provider 600. One example of an instance type can include the computer device 602A which is in communication with peripheral processor(s) 604A. Specifically, the computer device 602A and the peripheral processor(s) 604A can communicate over a local interconnect such as PCIe. Another example of an instance type can include the computer device 602B and peripheral processor(s) 604B. For example, the peripheral processor(s) 604B can be integrated within a multi-chip module or on the same die as a CPU of the computer device 602B. Yet another example of an instance type can include the computer device 602C without any peripheral processor(s). Thus, hardware instance types with and without peripheral processor(s) can be present within the resources of the compute service provider 600.

One or more computer devices 620 can be reserved for executing software components for managing the operation of the computer devices 602 and the software instances 606. For example, the computer device 620 can execute a management component 622. A client can access the management component 622 to configure various aspects of the operation of the software instances 606 purchased by the client. For example, the client can purchase, rent or lease instances and make changes to the configuration of the software instances. The configuration information for each of the software instances can be stored as a machine image (MI) 642 on the network-attached storage 640. As a specific example, the MI 642 can describe the information used to launch a VM instance. The MI can include a template for a root volume of the instance (e.g., an OS and applications), launch permissions for controlling which client accounts can use the MI, and a block device mapping which specifies volumes to attach to the instance when the instance is launched. The MI can also include a reference to a configurable hardware image (CHI) 642 which is to be loaded on peripheral processor(s) 604 when the instance is launched. The CHI includes configuration data for programming or configuring at least a portion of the peripheral processor(s) 604. As another specific example, the MI 642 can describe the information used to launch an instance of an operating system directly on one of the computer devices 620.

The client can also specify settings regarding how the purchased instances are to be scaled in response to demand. The management component can further include a policy document to implement client policies. An auto scaling component 624 can scale the instances 606 based upon rules defined by the client. In one embodiment, the auto scaling component 624 allows a client to specify scale-up rules for use in determining when new instances should be instantiated and scale-down rules for use in determining when existing instances should be terminated. The auto scaling component 624 can consist of a number of subcomponents executing on different computer devices 602A-602C or other computer devices. The auto scaling component 624 can monitor available computing resources over an internal management network and modify resources available based on need.

A deployment component 626 can be used to assist clients in the deployment of new instances 606 of computing resources. The deployment component can have access to account information associated with the instances, such as who is the owner of the account, credit card information, country of the owner, etc. The deployment component 626 can receive a configuration from a client that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 626 can utilize the client-provided configuration and cache logic to configure, prime, and launch new instances 606. For example, the deployment component 626 can be invoked when a client launches an instance from a control console, another instance, or a marketplace page. The control console can be a web-based service that provides an interface to a client of the compute service provider 600 so that the client can manage his or her account and access services. As one example, the control console can enable a user to upload MIs and/or CHIs to a private catalog, and images corresponding to a particular MI or CHI can be selected by the user from the private catalog when an instance is to be deployed. The configuration, cache logic, and other information used for launching instances may be specified by a client using the management component 622 or by providing this information directly to the deployment component 626. The instance manager can be considered part of the deployment component.

Client account information 628 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, a listing of the MI's and CHI's accessible to the client, etc.

One or more computer devices 630 can be reserved for executing software components for managing the download of configuration data to peripheral processor(s) 604 of the computer devices 602A-602C. For example, the computer device 630 can execute a logic repository service comprising an ingestion component 632, a library management component 634, and a download component 636. Computer device 630 can implement functions of logic repository service 410. The ingestion component 632 can receive shell logic and configurable logic designs or specifications and generate configuration data that can be used to configure the peripheral processor(s) 604. The library management component 634 can be used to manage source code, user information, and configuration data associated with the logic repository service. For example, the library management component 634 can be used to store configuration data generated from a user's design in a location specified by the user on the network-attached storage 640. In particular, the configuration data can be stored within a configurable hardware image 642 on the network-attached storage 640. Additionally, the library management component 634 can manage the versioning and storage of input files (such as the specifications for the configurable logic and the shell logic) and metadata about the logic designs and/or the users of the logic repository service. The library management component 634 can index the generated configuration data by one or more properties such as a user identifier, an instance type, a marketplace identifier, a machine image identifier, and a configurable hardware identifier, for example. The download component 636 can be used to authenticate requests for configuration data and to transmit the configuration data to the requestor when the request is authenticated. For example, agents on the computer devices 602A-B can send requests to the download component 636 when the instances 606 are launched that use the peripheral processor(s) 604. As another example, the agents on the computer devices 602A-B can send requests to the download component 636 when the instances 606 request that the peripheral processor(s) 604 be reconfigured while the peripheral processor(s) 604 is in operation.

The network-attached storage (NAS) 640 can be used to provide storage space and access to files stored on the NAS 640. For example, the NAS 640 can include one or more computer devices used for processing requests using a network file sharing protocol, such as Network File System (NFS). The NAS 640 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 660.

The network 660 can be utilized to interconnect the computer devices 602A-602C, the computer devices 620 and 630, and the storage 640. The network 660 can be a local area network (LAN) and can be connected to a Wide Area Network (WAN) 660 so that end users can access the compute service provider 600. It should be appreciated that the network topology illustrated in FIG. 6 has been simplified and that many more networks and networking devices can be utilized to interconnect the various computing systems disclosed herein.

Figure 7:
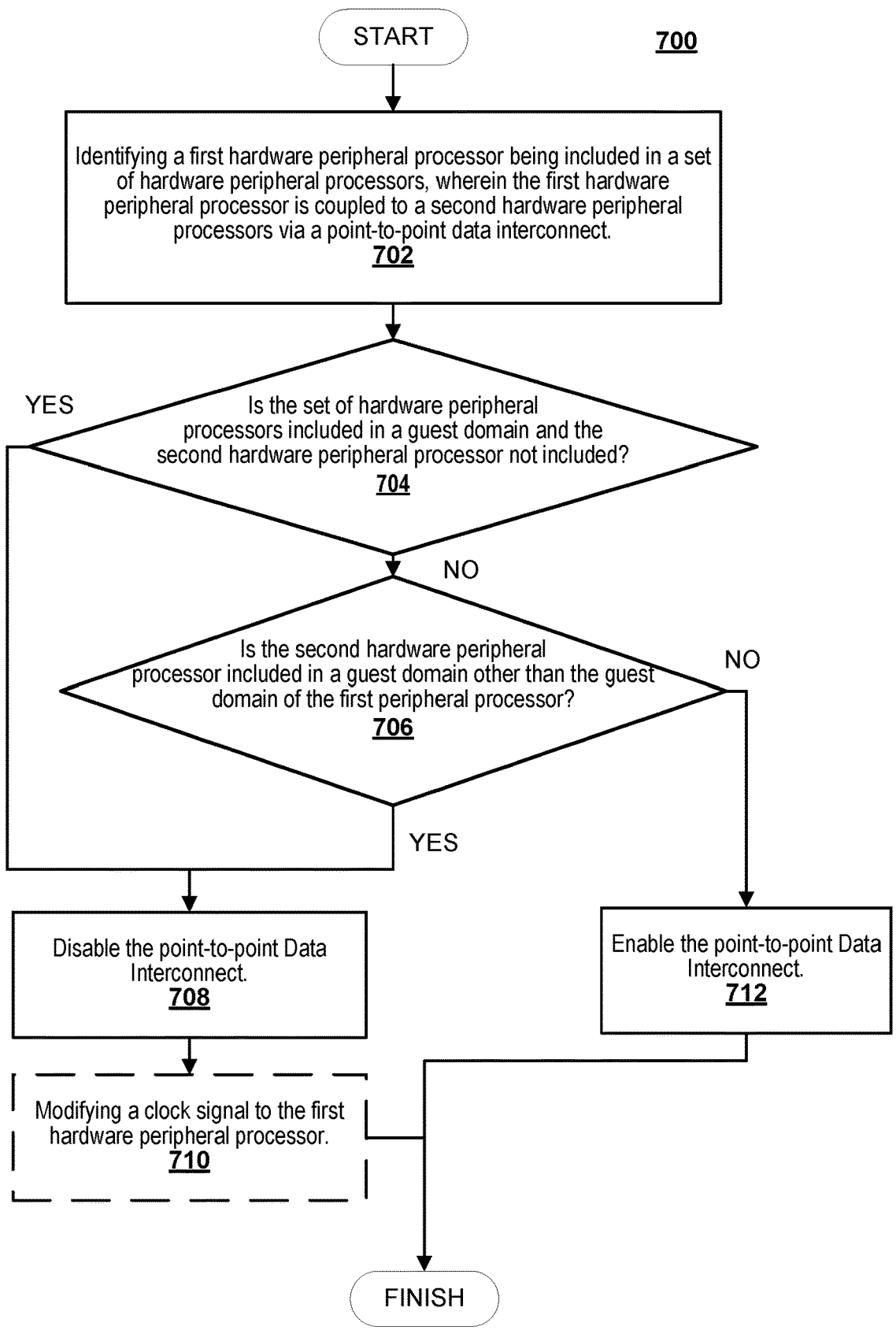
FIG. 7 illustrates an example flowchart of an exemplary embodiment of a method for implementing techniques of the disclosure.

FIG. 7 illustrates a flowchart of an exemplary embodiment of a method 700 that can implement features of the disclosure. Method 700 can be implemented by computer device 220, BMC 214, or host privileged virtual machine 120, for example. At 702, an identification can be made of a first hardware peripheral processor within a guest domain, the first hardware peripheral processor being coupled to a second hardware peripheral processor via a point-to-point data interconnect. The identification can be performed in response to a request of a user or client of service-provider infrastructure to have access to the first and/or second hardware peripheral processor of the service-provider infrastructure. The first and/or second hardware peripheral processor can be used as a hardware accelerator. The identification can occur in association with the first and/or second hardware peripheral processor being allocated from the service-provider infrastructure and being included within a domain for the user/client to access functionality of the first and/or second hardware peripheral processor. The first and second hardware peripheral processors can each be one of peripheral processors 440-446, for example. The point-to-point data interconnect can be one of interconnects 480.

At 704, a determination can be made as to whether the first hardware peripheral processor is included in the guest domain and the second hardware peripheral processors is not included in the guest. The determination can be made via a hypervisor or access control entity utilized to define the guest domain by (1) preventing access out of the domain by devices and/or users contained within and/or (2) by preventing access into the domain by other devices and/or users that are not included in the domain (and do not have a higher privilege level). The determination may be made in response to a request for a hardware peripheral processor to be added to or removed from a domain. At 706, a determination can be made otherwise as to whether the second hardware peripheral processor is included in a different guest domain than the first hardware peripheral processor. Such a determination can be made via a hypervisor or access control entity utilized to define the guest domain and/or by request(s) to add or remove hardware peripheral processor(s) to or from a domain.

If either 704 or 706 is true, then, at 708, the point-to-point data interconnect can be disabled. The point-to-point data interconnect can be disabled by, at 710, modifying a clock signal to the first hardware peripheral processor, opening a switch through which the point-to-point data interconnect is coupled between the first and second hardware peripheral processors, or commanding control logic within an interconnect monitoring circuit to inhibit routing of data between the first and second hardware peripheral processors, for example.

If both 704 and 706 are not true, then at 712, the point-to-point data interconnect can be enabled. Enabling the point-to-point data interconnect can be performed by modifying a clock signal to the first hardware peripheral processor, closing a switch through which the point-to-point data interconnect is coupled between the first and second hardware peripheral processors, or commanding control logic within an interconnect monitoring circuit to allow routing of data between the first and second hardware peripheral processors, for example.

Figure 8:
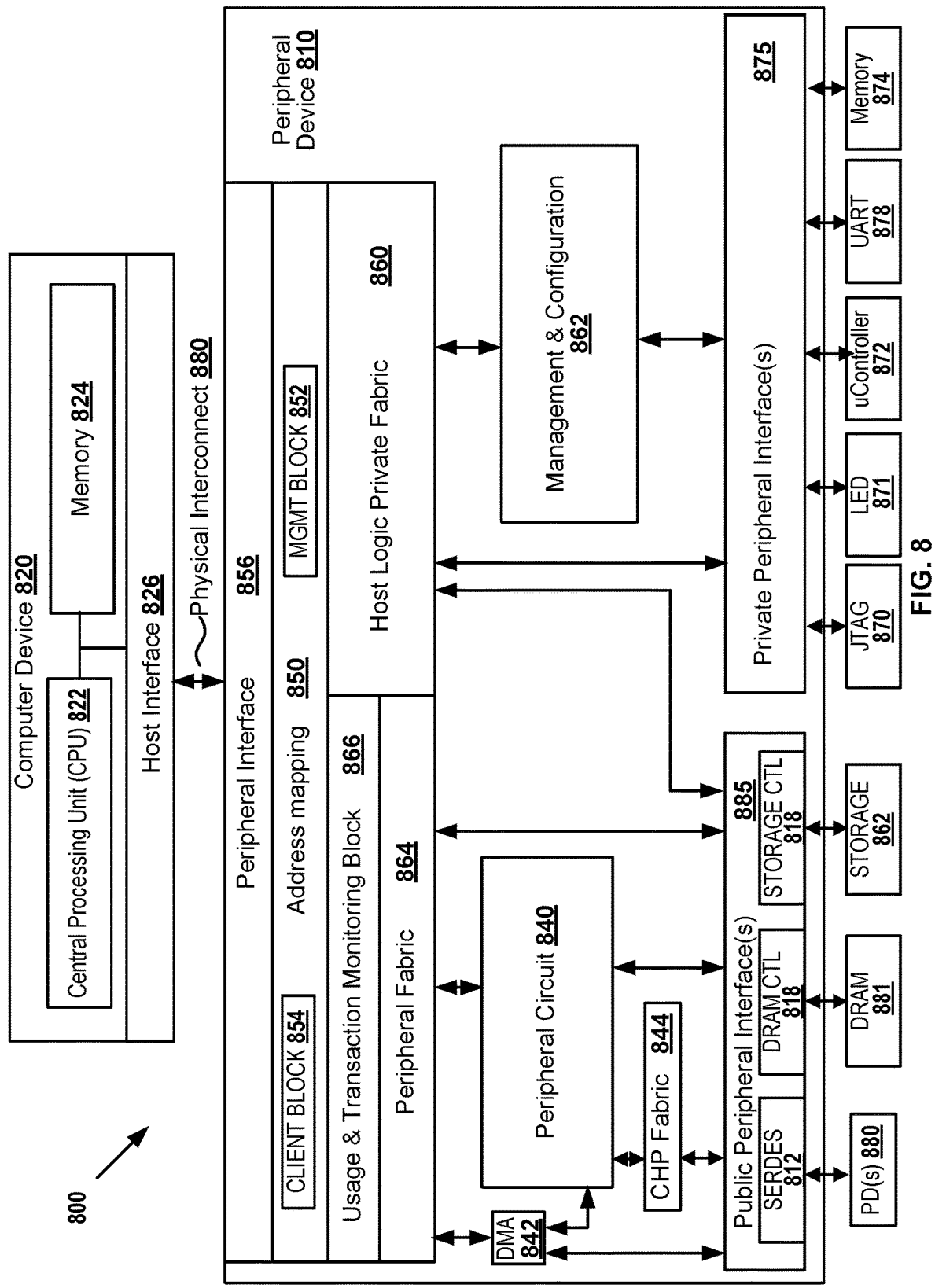
FIG. 8 illustrates a system diagram including additional features of a system including a peripheral circuit.

FIG. 8 illustrates a system diagram showing an example of a system 800 including a peripheral device 810 and a computer device 820. Peripheral device 810 can be similar to peripheral device 210 and computer device 820 can be similar to computer device 220. The computer device 820 and the peripheral device 810 can be connected via a physical interconnect 880. For example, the physical interconnect 880 can be PCI express, PCI, or any other interconnect that couples the computer device 820 to the peripheral device 810. The computer device 820 can include a CPU 822, memory 824, and a host interface 826. For example, the host interface 826 can provide bridging capability so that the computer device 820 can access devices that are external to the computer device 820. For example, the host interface 826 can include root complex functionality as used in PCI express.

The peripheral device 810 can include a peripheral circuit 840 and other hardware. The peripheral circuit 840 can be configured or programmed to perform various functions of the peripheral device 810. The peripheral circuit 840 can be configured multiple times with different configurations so that the peripheral circuit 840 can perform different functions to service multiple clients. The functions of the peripheral device 810 can be categorized based upon the purpose or capabilities of each function, or based upon when the function is loaded into the peripheral device 810. For example, the peripheral device 810 can include static logic, reconfigurable logic, and hard macros. The functionality for the static logic, reconfigurable logic, and hard macros can be configured at different times. Thus, the functionality of the peripheral device 810 can be loaded incrementally.

As disclosed herein, peripheral circuit 840 can include specialized interconnects that can be configured (e.g., enabled or disabled) at or after boot time. More specifically, configuration data specifying configuration of the processor interfaces can be loaded during or after a boot-up sequence. The boot-up sequence can include detecting a power event (such as by detecting that a supply voltage has transitioned from below a threshold value to above the threshold value) and configuring processor interfaces (including specialized interfaces) accordingly. An initialization sequence can be triggered in response to the power event or a reset being deasserted. After interfaces are configured, the peripheral device 810 can transition from a loading state to an operational state (e.g., runtime) wherein functionality of processors of the peripheral circuit 840 can be accessed by devices of corresponding client domain(s). In certain embodiments, the processor interfaces can be configured (or reconfigured) while peripheral processors are in an operational state. For example, a specific peripheral processor may be removed from one client domain and added to another during an operational state. If so, specialized interface(s) may be modified in order to allow the specific peripheral processor to communicate to other peripheral processors in the new client domain and prevent the specific peripheral processor from communicating with peripheral processors of other domains.

Commands from the computer device 820 bound for the peripheral device 810 can be identified using an address within the command. Specifically, if the address of the command falls within the range of addresses assigned to the peripheral device 810, the command can be determined to be destined for the peripheral device 810. The command can be sent over the physical interconnect 880 and received at the peripheral interface 856. The peripheral interface 856 can be an endpoint of the physical interconnect 880. It should be understood that the physical interconnect 880 can include additional devices (e.g., switches and bridges) arranged in a fabric for connecting devices or components to the computer device 820. Physical interconnect 880 can be a PCI or other bus that connects server computer 820 to a plurality of peripheral devices (including peripheral device 810).

The address mapping module 850 can analyze the address of the command and determine where to route the command within the peripheral device 810 based on the address. For example, the management block 852 can be assigned a first range of addresses and different functions can be accessed by using different addresses within that range. Commands with addresses falling within the range assigned to the management block 852 can be routed through the host logic private fabric 860 to different functional blocks within the host domain. For example, commands can be addressed to a management and configuration block 862. Similarly, the client block 854 can be assigned a second range of addresses and different functions can be accessed by using different addresses within that range.

The management and configuration block 862 can include functions related to managing and configuring the peripheral device 810. For example, the management and configuration block 862 can be used to configure peripheral processors within peripheral circuit 840. In order to facilitate configuration of peripheral processors of peripheral circuit 840, computer device 820 can send a command to the management and configuration block 862 to initiate configuration of peripheral circuit 840. Configuration of peripheral circuit 840 can include writing to registers of peripheral circuit 840, sending a signal to peripheral circuit 840, or sending a command to peripheral circuit 840.

The management and configuration block 862 can also be used to access private peripherals of the peripheral device 810. Private peripherals can include a JTAG (e.g., IEEE 1149.1) controller 870, light emitting displays (LEDs) 871, a microcontroller 872, a universal asynchronous receiver/transmitter (UART) 878, a memory 874 (e.g., a serial peripheral interface (SPI) flash memory), and other components that may be accessible via a host domain. The management and configuration block 862 can access the private peripherals by routing commands through the shell logic private fabric 860 and the private peripheral interface(s) 875. The private peripheral interface(s) 875 can directly communicate with the private peripherals.

Public peripherals are configurable and may reside on a client domain and be assessable by peripheral processor(s) of peripheral circuit 840. Public peripherals may be accessible by a client domain or a host domain. For example, the public peripherals can be accessed by addressing commands within the address range assigned to the management block 852. The public peripherals can be accessed by addressing commands within the address range assigned to the client block 854. Examples of the public peripherals are other configurable hardware platform(s) (CHP(s)) 880, DRAM 881 (e.g., DDR DRAM), storage devices 882 (e.g., hard disk drives and solid-state drives), and other various components that can be used to generate, store, or process information. The public peripherals can be accessed via the peripheral interfaces 885. Thus, the peripheral interfaces 885 can be an intermediary layer transposed between the public peripherals and the other functions of the peripheral device 810. Specifically, the peripheral interfaces 885 can format communications to the public peripherals into a native protocol of the public peripherals. Peripheral interfaces 885 are illustrated as including serializer-deserializer transceiver (SERDES) 812, a memory or dynamic random access memory (DRAM) controller 213 for signaling and controlling off-chip memory (such as a double data rate (DDR) DRAM 281), and a storage controller 214 for signaling and controlling a storage device 282 as example interfaces.

The client block 854 can be used to access components residing on the client domain, such as peripheral circuit 840. For example, a command directed to peripheral circuit 840 can cause data to be loaded, processed, and/or returned to the computer device 820. Specifically, the client domain component can be accessed using commands having an address within the range assigned to the client block 854. For example, a command can be sent from the computer device 820 to the peripheral circuit 840 via the client block 854. Specifically, commands addressed to the client block 854 can be routed through the peripheral fabric 864 to the peripheral circuit 840. Responses from the peripheral circuit 840 can be routed through the peripheral fabric 864 to the client block 854, and then back to the computer device 820. Additionally, the data and commands generated by the peripheral circuit 840 can be monitored using a usage and command monitoring block 866. The monitoring block 866 can potentially identify commands or data that violate predefined rules and can generate an alert to be sent. Additionally or alternatively, the monitoring block 866 can terminate any commands generated by the peripheral circuit 840 that violate any criteria of the monitoring block 866. Additionally, the monitoring block 866 can analyze information moving to or from the peripheral circuit 840 so that statistics about the information can be collected and accessed.

Data can also be transferred between the computer device 820 and the configurable logic by programming a direct memory access (DMA) engine 842. The DMA engine 842 can include control and status registers for programming or specifying DMA transfers from a source location to a destination location. As one example, the DMA engine 842 can be programmed to pull information stored within the memory 824 of computer device 820 into the peripheral circuit 840 or into the public peripherals of the peripheral device 810. As another example, the DMA engine 842 can be programmed to push data that has been generated by the peripheral circuit 840 to the memory 824 of the computer device 820. The data generated by the peripheral circuit 840 can be streamed from the peripheral circuit 840 or can be written to the public peripherals, such as the memory 881 or storage 882.

The peripheral circuit 840 can communicate with other peripheral devices 880, peripheral circuits, and/or computer devices. For example, the other peripheral devices 880, peripheral circuits, and/or computer devices can be connected by one or more serial lines that are in communication with the SERDES 812. The peripheral circuit 840 can generate commands to the different peripheral devices 880, peripheral circuits, and/or computer devices to the corresponding serial lines (via the SERDES 812) of the peripheral devices 880. Similarly, the peripheral circuit 840 can receive information from other peripheral devices 880 using the reverse path. Although a SERDES is illustrated, techniques utilizing bus or parallel communication techniques can also or alternatively be used to enable communications between peripheral processor(s) of peripheral circuit 840 and other peripheral devices 880, peripheral circuits, and/or computer devices. Peripheral interfaces 885 can enable communication between peripheral processors within a same domain and inhibit access between the peripheral processors that are not within the same domain, as disclosed herein.

Figure 9:
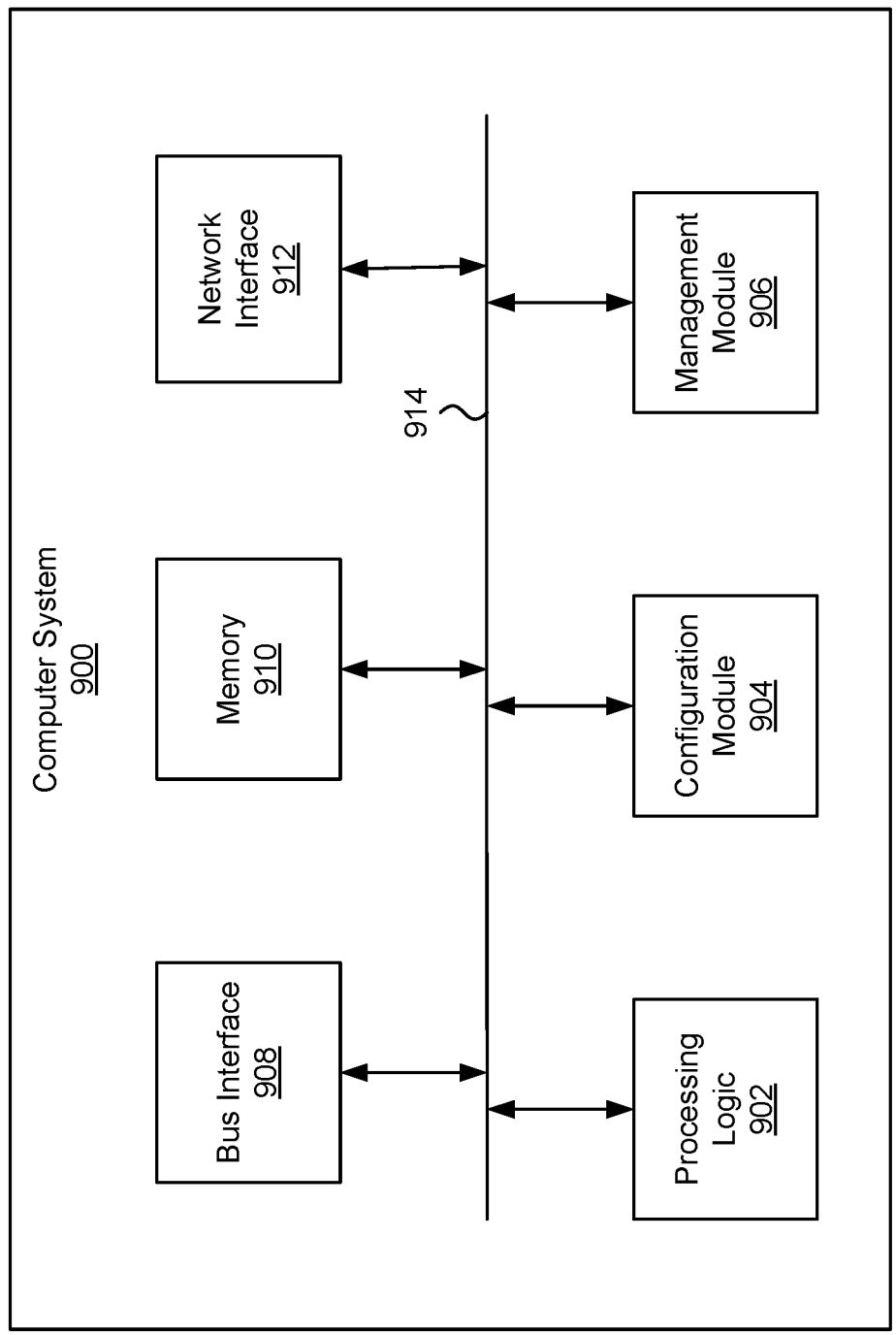
FIG. 9 illustrates an example environment of a computer system for implementing aspects in accordance with some embodiments.

FIG. 9 illustrates an example of a computer system 900. Functionality and/or several components of the computer system 900 may be used without limitation with other features disclosed elsewhere in this disclosure, without limitations.

In certain examples, the computer system 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computer system 900 may include additional modules, not illustrated here, such as components discussed with respect to the nodes disclosed in FIG. 9. In some implementations, the computer system 900 may include fewer modules. In some implementations, one or more of the modules may be combined into one module. One or more of the modules may be in communication with each other over a communication channel 910. The communication channel 910 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computer system 900, while in other cases some or all of the memory may be external to the computer system 900. The memory 910 may store an operating system comprising executable instructions that, when executed by the processing logic 902, provides the execution environment for executing instructions providing networking functionality for the computer system 900. The memory may also store and maintain several data structures and routing tables for facilitating the functionality of the computer system 900.

In some implementations, the configuration module 904 may include one or more configuration registers. Configuration registers may control the operations of the computer system 900. In some implementations, one or more bits in the configuration register can represent certain capabilities of the computer system 900. Configuration registers may be programmed by instructions executing in the processing logic 902, and/or by an external entity, such as a host device, an operating system executing on a host device, and/or a remote device. The configuration module 904 may further include hardware and/or software that control the operations of the computer system 900.

In some implementations, the management module 906 may be configured to manage different components of the computer system 900. In some cases, the management module 906 may configure one or more bits in one or more configuration registers at power up, to enable or disable certain capabilities of the computer system 900. In certain implementations, the management module 904 may use processing resources from the processing logic 902. In other implementations, the management module 906 may have processing logic similar to the processing logic 902, but segmented away or implemented on a different power domain than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium.

The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computer system 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 900 may include multiple network interface modules, each configured to communicate with a different network. For example, in these implementations, the computer system 900 may include a network interface module for communicating with a wired Ethernet network, a wireless 802.11 network, a cellular network, an Infiniband network, etc.

The various components and modules of the computer system 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 10:
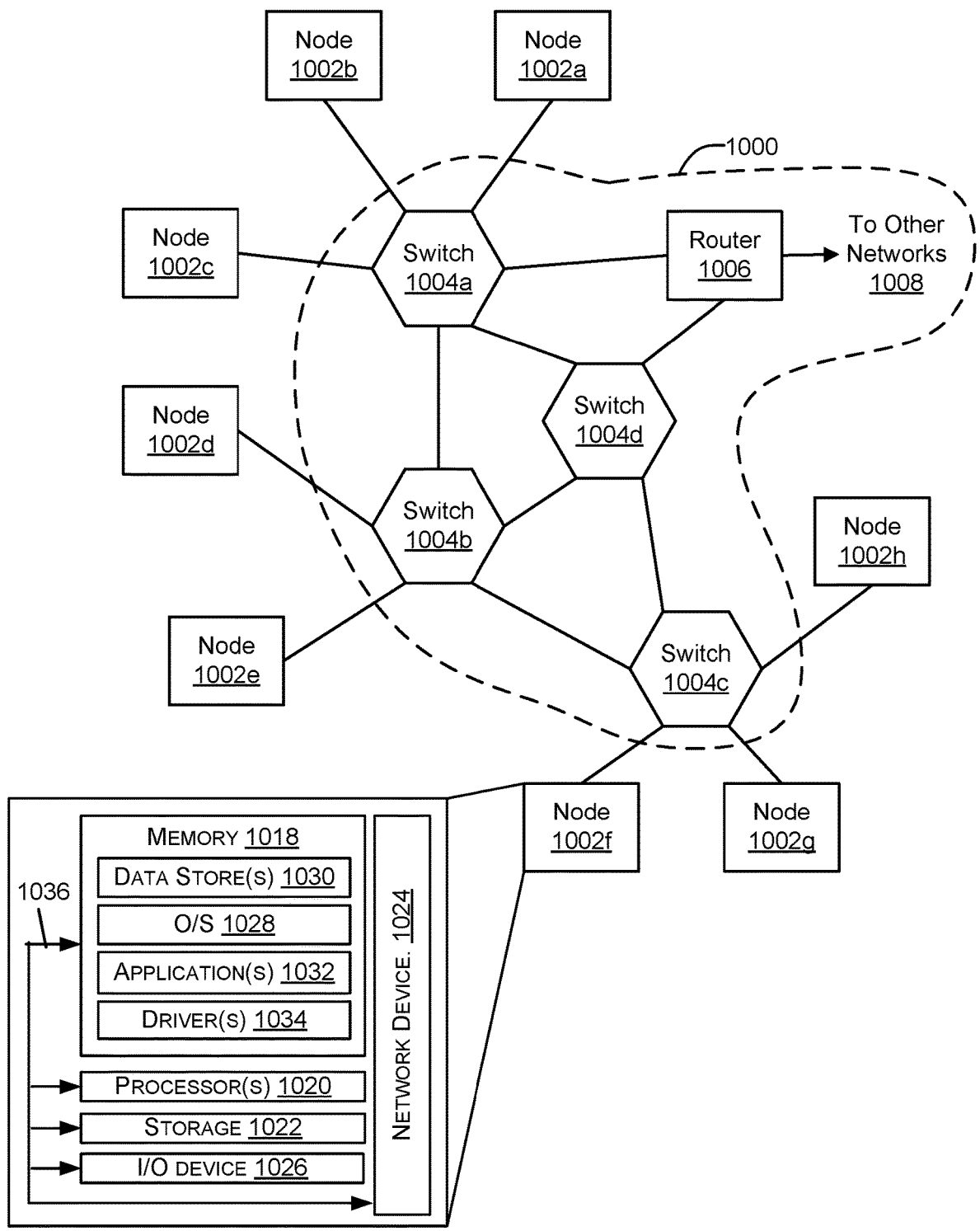
FIG. 10 illustrates an example architecture for features and systems described herein that includes one or more service provider computers and/or a user device connected via one or more networks, according to some embodiments.

FIG. 10 illustrates a network 1000, illustrating various different types of network devices 1000 of FIG. 9, such as nodes comprising the network device, switches and routers. Network 1000 can form a network infrastructure that can be used to implement a service provider network (e.g., cloud provider network). In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices 1000 for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers. Any of nodes 1002a-1002h can be or include functionality of computer system 1000.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices 1004. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1026 that allow the node(s) 1002a-1002h to communicate with a stored database, another computing device or server, user terminals and/or other devices on the network(s) 1000. The network device(s) 1024 of FIG. 10 may include similar components discussed with reference to the network device 900 of FIG. 9.

In some implementations, the network device 1026 is a peripheral device, such as a PCI-based device. In these implementations, the network device 1026 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1026 may be connected to a computing system using a PCIe interface.

A PCI-based device may include one or more functions. A "function" describes operations that may be provided by the network device 1026. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1026 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A host computer system, comprising:
 a central processing unit (CPU) of the host computer system configured to provide, in a multi-tenant virtualized environment, a first domain having a first access privilege level and being associated with a first tenant, and a second domain separate from the first domain having a second access privilege level and being associated with a second tenant;
 parallel processors coupled to the CPU via a data interface bus, wherein the parallel processors are interconnected via respective dedicated high-speed point-to-point data interconnects, wherein the high-speed point-to-point data interconnects are configurable to enable each of the parallel processors to transmit or receive data via a point-to-point communication to any other one of the parallel processors using the respective dedicated high-speed point-to-point data interconnect, wherein each of the parallel processors is configured to receive a number of clock signals from a dedicated oscillator, wherein each clock signal corresponding to a respective high-speed point-to-point data interconnect connected to a respective parallel processor is alterable by a baseboard management controller (BMC) to disable the respective interconnect; and
 wherein the CPU of the host computer system is configured to:
  determine which of the parallel processors are included in a first set of the parallel processors within the first domain and which of the parallel processors are included in a second set of the parallel processors within the second domain; and
  in response to determining which of the parallel processors are included in the first set and which of the parallel processors are included in the second set, causing an interconnect monitoring circuit to disable the respective dedicated high-speed point-to-point data interconnects coupling the first set of the parallel processors to the second set of the parallel processors, enabling the respective dedicated high-speed point-to-point data interconnects coupling the parallel processors in the first set within the first domain, and enabling the respective dedicated high-speed point-to-point data interconnects coupling the parallel processors in the second set within the second domain,
  wherein disabling respective dedicated highs-speed point-to-point data interconnects inhibits the point-to-point communications between the first set of the parallel processors within the first domain and the second set of the parallel processors within the second domain.

2. The computer system of claim 1, wherein the data interface bus is a peripheral component interconnect (PCI) data interface bus.

3. The computer system of claim 1, wherein the parallel processors are graphical processing units (GPUs).

4. The computer system of claim 3, wherein the communication speed of the dedicated high-speed point-to-point data interconnects is determined by the parallel processors.

5. The computer system of claim 1, wherein the parallel processors are configured to transmit data at a higher bandwidth via the dedicated high-speed point-to-point data interconnects than the data interface bus.

6. The system of claim 1, wherein the first set of the parallel processors and the second set of the parallel processors are each respectively disposed on separate and distinct circuit cards, wherein the high-speed point-to-point data interconnect traverses between the separate and distinct circuit cards.

7. A system, comprising:
 a first set of peripheral processors and a second set of peripheral processors, wherein the first set of peripheral processors and the second set of peripheral processors are coupled to a host system using a first bus, and wherein the first set of peripheral processors is coupled to the second set of peripheral processors using point-to-point data interconnects, wherein each of the peripheral processors is configured to receive a number of clock signals from a dedicated oscillator, wherein each clock signal corresponding to a respective point-to-point data interconnect connected to a respective peripheral processor is alterable by a baseboard management controller (BMC) to disable the respective interconnect, wherein a central processing unit (CPU) of the host system is configured to determine which peripheral processors of the first set of peripheral processors and which peripheral processors of the second set of peripheral processors to assign to a first domain and which peripheral processors of the first set of peripheral processors and which peripheral processors of the second set of peripheral processors to assign to a second domain; and
 an interconnect monitoring circuit configured to:
  receive a first command to disable the point-to-point data interconnects between the first set of peripheral processors and the second set of peripheral processors, and to disable the point-to-point data interconnects between the peripheral processors in the first set of peripheral processors and to disable the point-to-point data interconnects between the peripheral processors in the second set of peripheral processors;
  disable the point-to-point data interconnects in response to receiving the first command;
  receive a second command to enable the point-to-point data interconnects between the peripheral processors of the first set of peripheral processors and the peripheral processors of the second set of peripheral processors determined to be in the first domain, and to enable the point-to-point data interconnects between the peripheral processors of the first set of peripheral processors and the peripheral processors of the second set of peripheral processors determined to be in the second domain; and
  enable the point-to-point data interconnects in response to receiving the second command,
  wherein the point-to-point data interconnects are configurable to connect any peripheral processor to any other peripheral processor,
  wherein the first command and the second command are received in response to determining which peripheral processors are assigned to the first domain and which peripheral processors are assigned to the second domain,
  wherein the first domain has a first access privilege level and the second domain has a second access privilege level, wherein the first domain is separate from the second domain, and
  where in the first command and the second command are received using an out-of-band interconnect.

8. The system of claim 7, wherein the out-of-band interconnect is an interconnect between the host system and the interconnect monitoring circuit that is separate from the first bus.

9. The system of claim 7, wherein the interconnect monitoring circuit comprises a clock generator configured to receive the command to disable the point-to-point data interconnect from the BMC and, in response to receiving the command, to output a corresponding clock signal or absence of a clock signal.

10. The system of claim 7, wherein the point-to-point data interconnect includes a switch, and wherein the disabling the point-to-point data interconnect between the peripheral processors of the first set of peripheral processors and the peripheral processors of the second set of peripheral processors includes configuring the switch to disable the point-to-point data interconnect.

11. The system of claim 7, wherein the first set of peripheral processors and the second set of peripheral processors are each respectively disposed on separate and distinct circuit cards, wherein the point-to-point data interconnect traverses between the separate and distinct circuit cards.

12. The system of claim 7, wherein the point-to-point data interconnects are configurable to couple only one peripheral processor of the first set of peripheral processors and one peripheral processor of the second set of peripheral processor from among all peripheral processors.

13. The system of claim 12, wherein the point-to-point data interconnect is a dedicated hardware interconnect for transferring data between the one peripheral processor of the first set of peripheral processors and the one peripheral processor of the second set of peripheral processors.

14. The system of claim 13, wherein the first set of peripheral processors and the second set of peripheral processors are configured to communicate with a processor of the host system via a common data interface bus.

15. The method of claim 7, wherein enabling the point-to-point data interconnect includes modifying a clock signal provided to the first peripheral processor.

16. A method, comprising:
    determining, by a central processing unit (CPU) of a host computer system, whether to assign a first hardware peripheral processor of a first set of peripheral processors and a second hardware peripheral processor of a second set of peripheral processors to a same guest domain, wherein the first hardware peripheral processor is coupled to the second hardware peripheral processor via a point-to-point data interconnect, and wherein the first set of peripheral processors and the second set of peripheral processors are coupled to the CPU of the host computer system via a data interface bus;
    in response to determining not to assign the first hardware peripheral processor and the second hardware peripheral processor to the same guest domain, sending, by the CPU of the host computer system, a first instruction to disable the point-to-point data interconnect coupling the first hardware peripheral processor to the second hardware peripheral processor, wherein the point-to-point data interconnects are configurable to enable high-speed data transmission between any of the peripheral processors in the first set of peripheral processors and the second set of peripheral processors, wherein each of the hardware peripheral processors is configured to receive a number of clock signals from a dedicated oscillator, wherein each clock signal corresponding to a respective point-to-point data interconnect connected to a respective peripheral processor is alterable by a baseboard management controller (BMC) to disable the respective interconnect; and
    assigning, by the CPU of the host computer system, the first peripheral processor to a first guest domain having a first access privilege level, and assigning the second hardware peripheral processor to a second guest domain having a second access privilege level.

17. The method of claim 16, further comprising:
    in response to subsequently determining that first hardware peripheral processor and the second hardware peripheral processor are assigned to the same guest domain, sending a second instruction to enable the point-to-point data interconnect coupling the first hardware peripheral processor to the second hardware peripheral processor.

18. The method of claim 16, wherein enabling the point-to-point data interconnect includes modifying a clock signal provided to the first hardware peripheral processor.

19. The system of claim 16, wherein the point-to-point data interconnect is disabled via a command received over an out-of-band interconnect between a host system and the first peripheral processor.

20. The system of claim 16, wherein the first hardware peripheral processor and the second hardware peripheral processor are each respectively disposed on separate and distinct circuit cards, wherein the point-to-point data interconnect traverses between the separate and distinct circuit cards.

* * * * *